United States Patent
Choudhry et al.

(10) Patent No.: US 12,045,869 B2
(45) Date of Patent: Jul. 23, 2024

(54) APPARATUS, METHOD, AND COMPUTER-READABLE MEDIUM FOR FACILITATING ELECTRONIC WEBPAGE PURCHASES

(71) Applicant: Walmart Apollo, LLC, Bentonville, AR (US)

(72) Inventors: Vikas Choudhry, Burlingame, CA (US); Amit Agarwal, Sunnyvale, CA (US); Alfonso Acevedo, San Francisco, CA (US); Avery Armour, San Francisco, CA (US); Anthony Soohoo, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 48 days.

(21) Appl. No.: 16/247,474

(22) Filed: Jan. 14, 2019

(65) Prior Publication Data

US 2020/0226666 A1    Jul. 16, 2020

(51) Int. Cl.
  *G06Q 30/0601*    (2023.01)
  *G06F 3/04817*    (2022.01)
  *G06F 3/0483*    (2013.01)

(52) U.S. Cl.
  CPC ..... *G06Q 30/0641* (2013.01); *G06F 3/04817* (2013.01); *G06F 3/0483* (2013.01); *G06Q 30/0621* (2013.01); *G06Q 30/0633* (2013.01)

(58) Field of Classification Search
  CPC .............. G06Q 30/0601–0645; G06Q 30/08
  (Continued)

(56) References Cited

U.S. PATENT DOCUMENTS

| | | | |
|---|---|---|---|
| 8,285,602 B1 * | 10/2012 | Yi | G06Q 30/00 705/26.7 |
| 8,965,998 B1 * | 2/2015 | Dicker | G06Q 30/0633 709/217 |

(Continued)

OTHER PUBLICATIONS

Cyber monday: The season's best deals—no fighting for parking. no waiting in line. just lean back, put your feet up and shop. (Nov. 25, 2011). Business Wire Retrieved from https://dialog.proquest.com/professional/docview/1069547633?accountid=161862 (Year: 2011).*

(Continued)

*Primary Examiner* — Jeffrey A. Smith
*Assistant Examiner* — Ashley D Preston
(74) *Attorney, Agent, or Firm* — Morgan, Lewis & Bockius LLP; Manita Rawat

(57) ABSTRACT

A webpage serving system is provided and generally includes a server and a computing device. The server may receive a webpage data request for a webpage from the computing device. In response, the server may transmit data identifying a webpage that allows a plurality of items to be added to an online shopping cart in one transaction. The data may include a document, such as an HTML document, based on the type of webpage requested. The document may include instructions to download a particular bundle from a server. The server may also receive a request from the computing device to add at least one item of the plurality of items to the online shopping cart. In response, the server may add the requested item to the online shopping cart. The server may also transmit data confirming that the requested item was added to the online shopping cart.

19 Claims, 9 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 9,301,015 | B2* | 3/2016 | Lenahan | H04N 21/4126 |
| 10,021,207 | B1* | 7/2018 | Harikumar | H04L 67/566 |
| 11,188,353 | B2 | 11/2021 | Byard et al. | |
| 2002/0052806 | A1* | 5/2002 | Hodson | G06Q 30/0601 |
| | | | | 705/26.8 |
| 2002/0065721 | A1* | 5/2002 | Lema | G06Q 30/0217 |
| | | | | 705/14.64 |
| 2009/0150262 | A1* | 6/2009 | Mizhen | G06Q 30/0601 |
| | | | | 705/26.1 |
| 2011/0044354 | A1* | 2/2011 | Wei | H04L 41/0826 |
| | | | | 370/468 |
| 2013/0013449 | A1* | 1/2013 | Sinha | G06Q 30/0609 |
| | | | | 705/26.8 |
| 2013/0138767 | A1* | 5/2013 | Vecera | G06F 16/95 |
| | | | | 709/217 |
| 2013/0318208 | A1* | 11/2013 | Seshadri | G06F 16/957 |
| | | | | 709/219 |
| 2014/0281918 | A1 | 9/2014 | Wei et al. | |
| 2015/0088968 | A1 | 3/2015 | Wei et al. | |
| 2015/0134491 | A1* | 5/2015 | Ostroff | G06Q 30/0643 |
| | | | | 705/27.1 |
| 2015/0161717 | A1* | 6/2015 | Deleuran Mumm | G06F 3/04883 |
| | | | | 705/27.2 |
| 2015/0363872 | A1* | 12/2015 | Weinhold | G06Q 30/0222 |
| | | | | 705/14.23 |
| 2016/0283592 | A1 | 9/2016 | Mi et al. | |
| 2017/0270208 | A1* | 9/2017 | Spathelf | G06Q 30/0623 |
| 2018/0267847 | A1 | 9/2018 | Smith et al. | |
| 2019/0266227 | A1 | 8/2019 | Kirn et al. | |
| 2020/0034915 | A1* | 1/2020 | Paisley | G06K 7/1417 |
| 2020/0265491 | A1* | 8/2020 | Young | G06F 16/35 |

OTHER PUBLICATIONS

Stremersch, S., & Tellis, G. J. (2002). Strategic bundling of products and prices: A new synthesis for marketing. Journal of Marketing, 66(1), 55-72. doi:http://dx.doi.org/10.1509/jmkg.66.1.55.18455 (Year: 2002).*

Vanity upgrades to magento enterprise for improved functionality: Lyons Consulting Group Tailors Site for Better Customer Experience. (May 11, 2011). PR Newswire Retrieved from https://dialog.proquest.com/professional/docview/865706119?accountid=131444 (Year: 2011).*

* cited by examiner

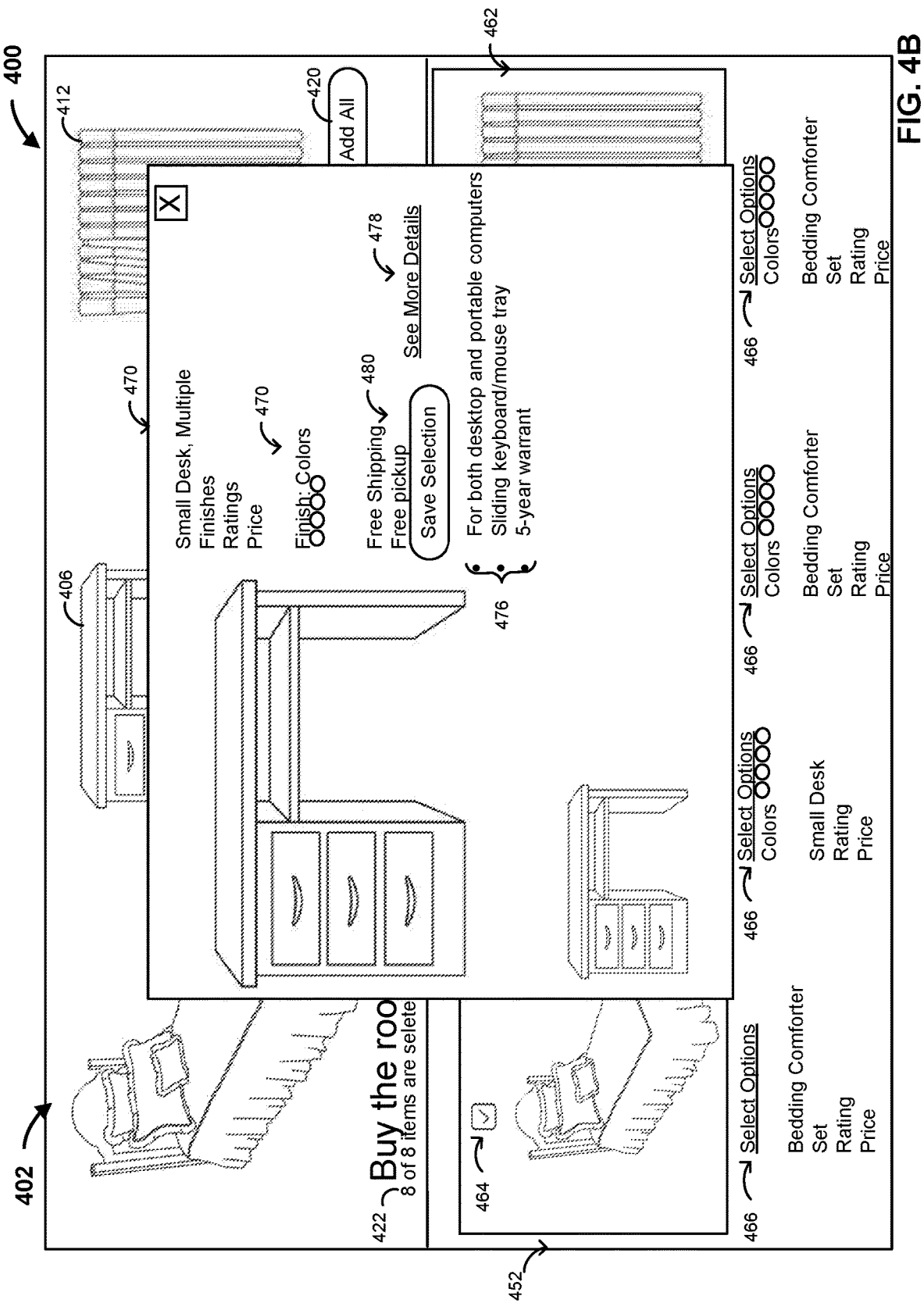

APPARATUS, METHOD, AND COMPUTER-READABLE MEDIUM FOR FACILITATING ELECTRONIC WEBPAGE PURCHASES

CROSS-REFERENCE TO RELATED APPLICATIONS

This application is related to U.S. application Ser. No. 16/247,481 filed on Jan. 14, 2019, which is hereby incorporated by reference in its entirety.

TECHNICAL FIELD

The disclosure relates generally to electronic purchasing and, more specifically, to methods and apparatus that facilitate webpage purchases.

BACKGROUND

At least some retailers allow for customers to purchase items electronically, such as from a web site. A customer may engage a web browser to visit the retailer's web site. The web site may allow the customer to search for an item, and add the item to the customer's online shopping cart. For example, after searching for and locating a product, a customer may click on an image of the product which redirects the customer to a webpage that includes more detailed information about the product. The webpage may also allow the customer to begin the purchasing process by giving the customer an option to add the product to the customer's online shopping cart. The customer may search for additional items, adding each item the customer would like to purchase to the customer's online shopping cart. When the customer is done adding items to their online shopping cart, the customer may finalize the purchases by performing a checkout. The checkout allows the customer to specify the method of payment for the products and address of delivery, for example. The more items the customer would like to buy from a retailer, however, the more time it takes the customer to add the items to their online shopping cart and purchase the items. Moreover, customers may need to assure that items they are purchasing coordinate with each other well. For example, customers may need to assure products are operable with each other, or visually coordinate with each other. As such, there are opportunities to improve how customers make electronic purchases.

SUMMARY

Among other advantages, the embodiments described herein may allow a user to add multiple items to an online shopping cart simultaneously. As a result, the embodiments may allow a customer to more quickly purchase multiple items. The embodiments may also allow items that coordinate well together to be offered for sale and purchased simultaneously. For example, a retailer may pre-coordinate items and have them displayed together on a website, where the website allows the customer to add the items to a purchase icon, such as their online (e.g., electronic, ecommerce) shopping cart, at the same time.

The embodiments may also allow for the reduction of traffic on a website. The embodiments may also allow for the reduction of the use of resources for a website. For example, rather than having a user navigate to multiple webpages to view and purchase several items, the user may navigate to just one webpage that displays all of the items. In addition, because the items are displayed on one page, the requesting and fetching of webpage data, such as from a server, is reduced. Other benefits would also be recognized by those skilled in the art.

For example, in some embodiments, a web serving system is provided that includes a computing device (e.g., a server). The computing device can receive a webpage data request for a webpage, and transmit, in response to the webpage data request, data identifying the webpage. The webpage may allow a plurality of items to be added to an online shopping cart in one transaction. The computing device may receive a request to add at least one item of the plurality of items to the online shopping cart, and can add the least one item of the plurality of items to the online shopping cart. In some examples, the computing device may, in response to the request to add the at least one item of the plurality of items to the online shopping cart, transmit data identifying an options modal window that allows for the selection of options for the at least one item. In some examples, the computing device may receive a request to view options of an item of the plurality of items. In response to the request to view the options of the item, the computing device can transmit data identifying a window that displays at least one option for the item. The computing device can transmit data confirming that the at least one item of the plurality of items was added to the online shopping cart.

In some embodiments, a method by a computing device includes receiving a webpage data request for a webpage. The method also includes transmitting, in response to the webpage data request, data identifying the webpage, where the webpage allows a plurality of items to be added to an online shopping cart in one transaction. The method may further include receiving a request to add at least one item of the plurality of items to the online shopping cart, and adding the at the least one item of the plurality of items to the online shopping cart. In some examples, the method includes, in response to the request to add the at least one item of the plurality of items to the online shopping cart, transmitting data identifying an options modal window that allows for the selection of options for the at least one item. In some examples, the method includes receiving a request to view options of an item of the plurality of items. In response to the request to view the options of the item, the method includes transmitting data identifying a window that displays at least one option for the item. The method may also include transmitting data confirming that the at least one item of the plurality of items was added to the online shopping cart.

In some examples a non-transitory, computer-readable storage medium includes executable instructions that, when executed by one or more processors, cause the one or more processors to perform operations including receiving a webpage data request for a webpage. The operations also includes transmitting, in response to the webpage data request, data identifying the webpage. The webpage allows a plurality of items to be added to an online shopping cart in one transaction. The operations may further include receiving a request to add at least one item of the plurality of items to the online shopping cart, and adding the at the least one item of the plurality of items to the online shopping cart. In some examples, the computing device may, in response to the request to add the at least one item of the plurality of items to the online shopping cart, transmit data identifying an options modal window that allows for the selection of options for the at least one item. In some examples, the operations include receiving a request to view options of an item of the plurality of items. In response to the request to view the options of the item, the operations include transmitting data identifying a window that displays at least one option for the item. The operations may also include transmitting data confirming that the at least one item of the plurality of items was added to the online shopping cart.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIGS. 4A-4C illustrate example webpages that may be provided by the server of FIG. 1, in accordance with some embodiments;

DETAILED DESCRIPTION

Figure 1:
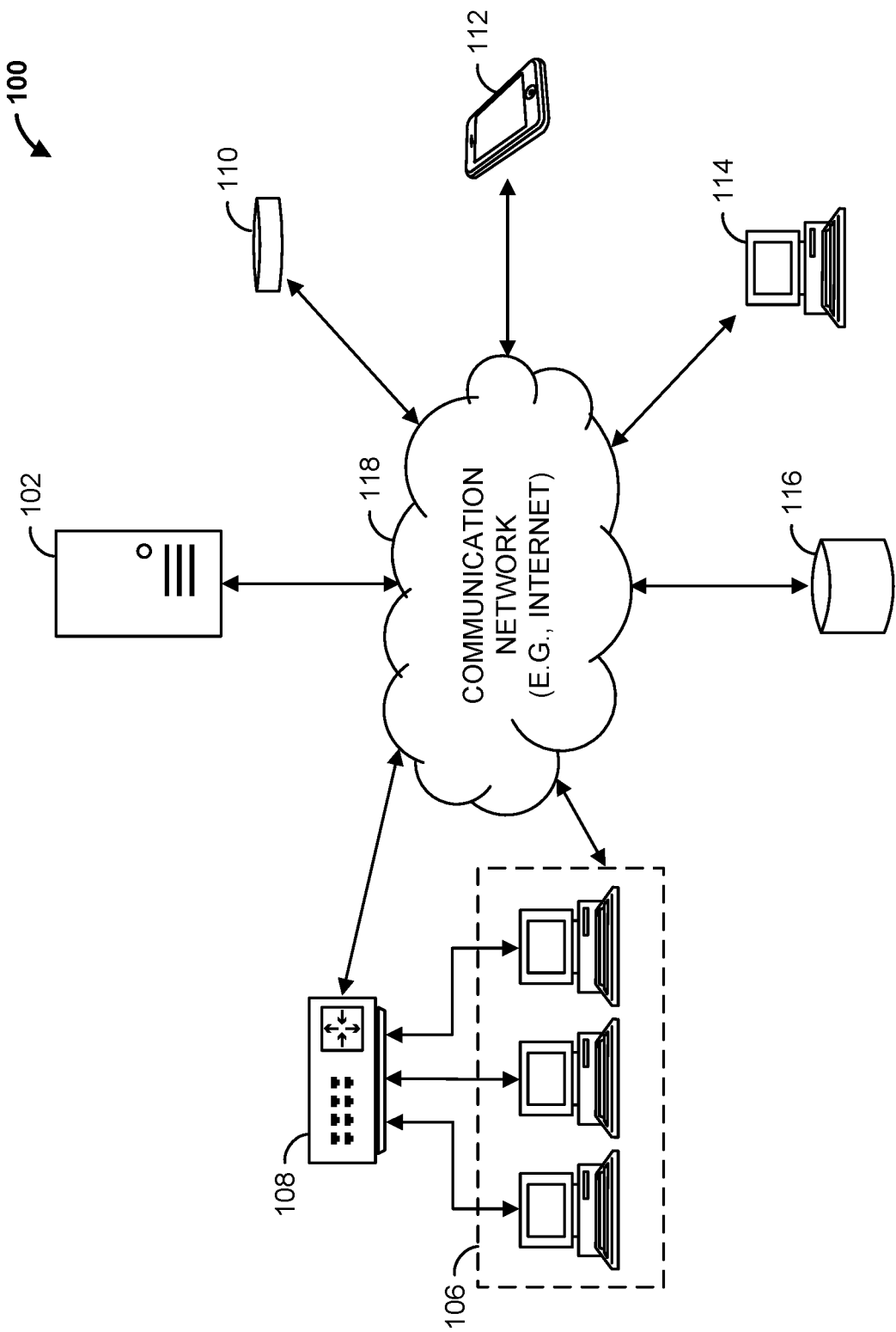
FIG. 1 is a block diagram of a webpage serving system, in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a web serving system 100 that includes a server 102 (e.g., a web server), workstation(s) 106, database 116, and multiple customer computing devices 110, 112, 114 operatively coupled over network 118. Server 102 and multiple customer computing devices 110, 112, 114 can each be any suitable computing device that includes any hardware or hardware and software combination for processing and handling information. In addition, each can transmit data to, and receive data from, communication network 118.

For example, server 102 can be a computer, a workstation, a laptop, a mobile device such as a cellular phone, a cloud-based server, or any other suitable computing device. Each of multiple customer computing devices 110, 112, 114 can be a mobile device such as a cellular phone, a laptop, a computer, a tablet, a personal assistant device, a voice assistant device, a digital assistant, or any other suitable computing device.

Additionally, each of server 102 and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, web serving system 100 can include any number of customer computing devices 110, 112, 114. Similarly, web serving system 100 can include any number of workstation(s) 106, servers 102, and databases 116.

Workstation(s) 106 are operably coupled to communication network 118 via router (or switch) 108. For example, workstation(s) 106 can communicate with server 102 over communication network 118. The workstation(s) 106 can allow for the configuration and/or programming of server 102, such as the controlling and/or programming of one or more processors of server 102. In some examples, server 102 may be a web server that hosts one or more webpages, such as a retailer's website. Workstation(s) 106 may be operable to access and program (e.g., configure) the webpages hosted by server 102.

Server 102 is also operable to communicate with database 116 over communication network 118. For example, server 102 can store data to, and read data from, database 116. Database 116 can be a remote storage device, such as a cloud-based server, a memory device on another application server, a networked computer, or any other suitable storage device. Although shown remote to server 102, in some examples database 116 can be a local storage device to server 102, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Server 102 can also communicate with first customer computing device 110, second customer computing device 112, and Nth customer computing device 114 over communication network 118. Similarly, first customer computing device 110, second customer computing device 112, and Nth customer computing device 114 are operable to communicate with server device 102 over communication network 118. For example, server 102 can receive data (e.g., messages) from, and transmit data to, first customer computing device 110, second customer computing device 112, and Nth customer computing device 114.

In some examples, server 102 and workstation(s) 106 can be operated by a retailer, while customer computing devices 110, 112, 114 can be computing devices operated by customers of a retailer. In some examples, server 102 hosts one or more webpages of a website. One or more of first customer computing device 110, second customer computing device 112, and Nth customer computing device 114 may be operable to load one or more of the webpages hosted by server 102 via, for example, the execution of a web browser. In some examples, customer computing devices 110, 112, 115 are operable to view and interact with a website hosted on server 102. For example, customer computing devices 110, 112, 115 may be operable to conduct a search on a website hosted by server 102 by communicating with server 102 over communication network 118.

Web serving system 100 allows for the providing, and displaying, of one or more webpages. For example, server 102 may host a plurality of webpages for a retailer's website. Customer computing devices 110, 112, 115 may execute a web browser that allows for the loading of webpages. A user may enter into an address bar of the web browser a web address of a webpage hosted by server 102 to request the webpage. Server 102 may determine the type of webpage requested, and provide a document, such as a Hypertext Markup Language (HTML) document, to the web browser based on the type of webpage requested. For example, server 102 may provide a first document in response to a webpage request for a first webpage of a web site, and may provide a second document, different than the first document, in response to a webpage request for a second webpage of the website. The document may be rendered by the web browser to display the corresponding webpage.

The provided documents may each contain instructions to download additional information, such as one or more files, such as script files (e.g., JavaScript® files). The additional information may be packaged in a bundle and hosted on server 102 or another server, such as a web server or a cloud-based server. The instructions for the first document provided in response to the webpage request for the first webpage may be different than the instructions for the second document provided in response to the webpage request for the second webpage. For example, while the first document may include instructions to download a first bundle, the second document may include instructions to download a second bundle.

As an example, server 102 may host webpages for a retailer's website. The website may include a first webpage that allows a customer to add one item to an online shopping cart at a time, and a second webpage that allows the customer to add multiple items together to the online shopping cart in one transaction (e.g., at one time). One or more of customer computing devices 110, 112, 115 may request, via the execution of a web browser, the first webpage or the second webpage from server 102.

In response to a request for the first webpage, server 102 may provide a first HTML document that includes instructions to download a first bundle from a server. The first bundle may include information (e.g., one or more script files) that enables the first webpage to provide one or more functions, such as to allow the customer to add the one item to the online shopping cart. In response to a request for the second webpage, server 102 may provide a second HTML document that includes instructions to download a second bundle from the server. The second bundle may include information that enables the second webpage to provide one or more functions, such as allow the customer to add multiple items to the online shopping cart in one transaction (e.g., at one time). Each type of webpage may associate with a particular bundle, for example.

In some examples, as noted above, a webpage hosted by server 102 may allow a customer to select or unselect one or more items of a plurality of items offered for sale on the webpage. The plurality of items may include items that operate or coordinate well together. In some examples, the webpage may further allow a customer to engage an icon on the webpage to allow the customer to view further details (e.g., fulfillment, short description, options, etc.) for the item. For example, the customer may click on a "Quick View" or "Select Options" icon to view the further details. In response to engaging the icon, the webpage may provide another window (e.g., a floating window) that allows the customer to view and select options for the item. Server 102 saves any selections made by the customer so they are available at checkout.

Once the customer has selected all of the items from the webpage that they would like to purchase, the webpage may allow the customer to engage another icon on the webpage, such as an "Add Items" icon, which may present the customer with another window (e.g., a floating window) allowing the customer to make option selections for the selected items. In some examples, these option selections are only available for items for which the customer did not previously specify option selections (e.g., for items for which the customer did not select options by clicking on a "Quick View" or "Select Options" icon).

Once the customer has selected options for these items, the customer may engage yet another icon on the webpage, such as a "Continue" icon, or "Add to Cart" icon, which will add all of the selected items to an online shopping cart in one transaction. The webpage may display a summary message of the items added to the online shopping cart, and may further display icons for the user to engage to either continue shopping (e.g., "Continue Shopping" icon), or to proceed to the online shopping cart for checkout and purchase (e.g., "Checkout" icon).

Figure 2:
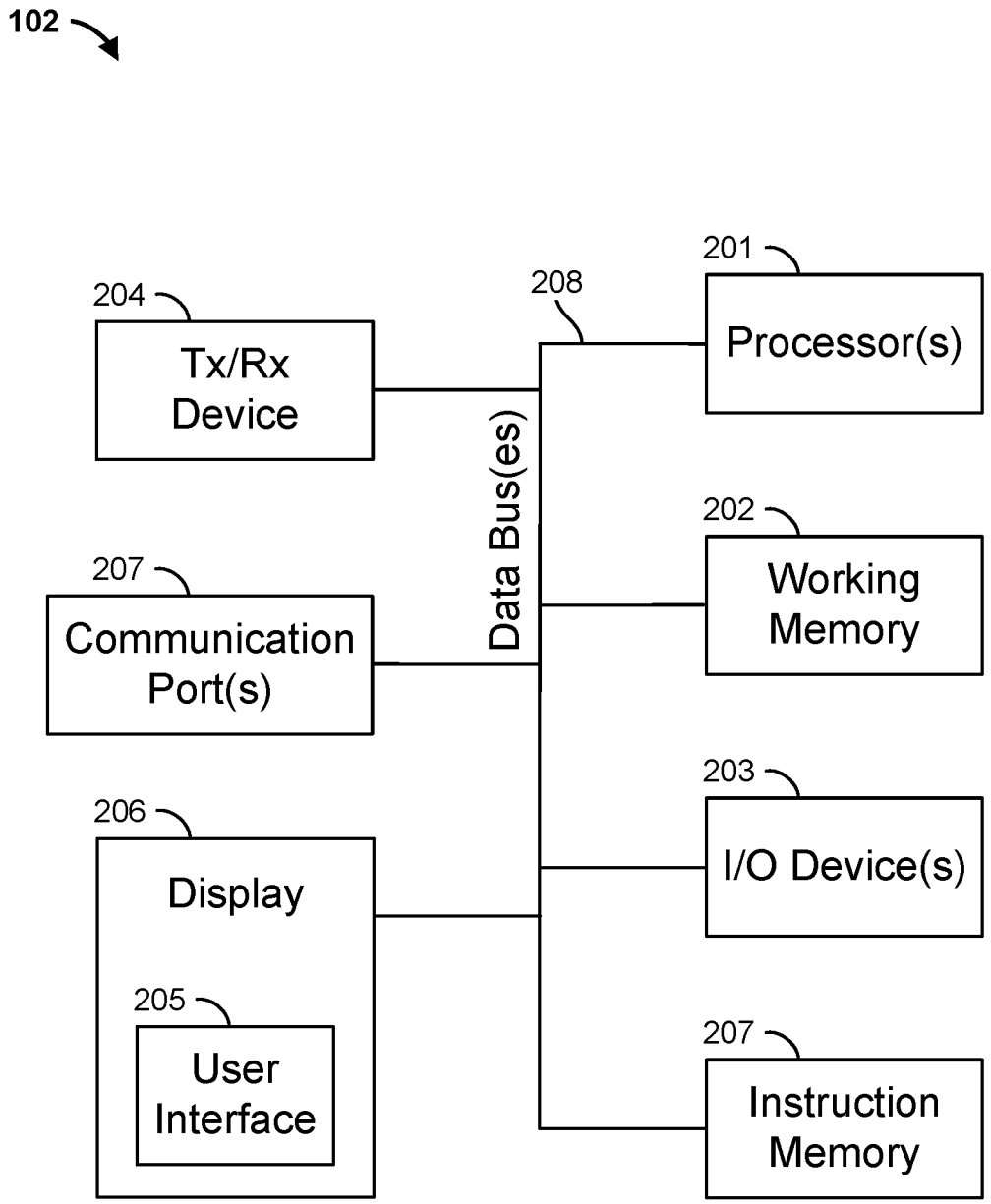
FIG. 2 is a block diagram of the server of the webpage serving system of FIG. 1, in accordance with some embodiments.

FIG. 2 illustrates server 102 of FIG. 1 in more detail. Server 102 can include one or more processors 201, working memory 202, one or more input/output (I/O) devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processor(s) 201 can include one or more central processing units (CPUs), one or more graphics processing units (GPUs), application specific integrated circuits (ASICs), digital signal processors (DSPs), and the like.

Processor(s) 201 can be configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207.

Processor(s) 201 can also use working memory 202 to store dynamic data created during the operation of server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allows for the transfer (e.g., uploading or downloading) of data, such as data to be transmitted to and stored in database 116.

Display 206 can display user interface 205. User interfaces 205 can enable user interaction with server 102. For example, user interface 205 can be a user interface for an application executed by processor(s) 201. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 server 102 will be operating in. Processor(s) 201 is operable to receive data from, or send data to, a network, such as communication network 118 of FIG. 1, via transceiver 204.

Figure 3:
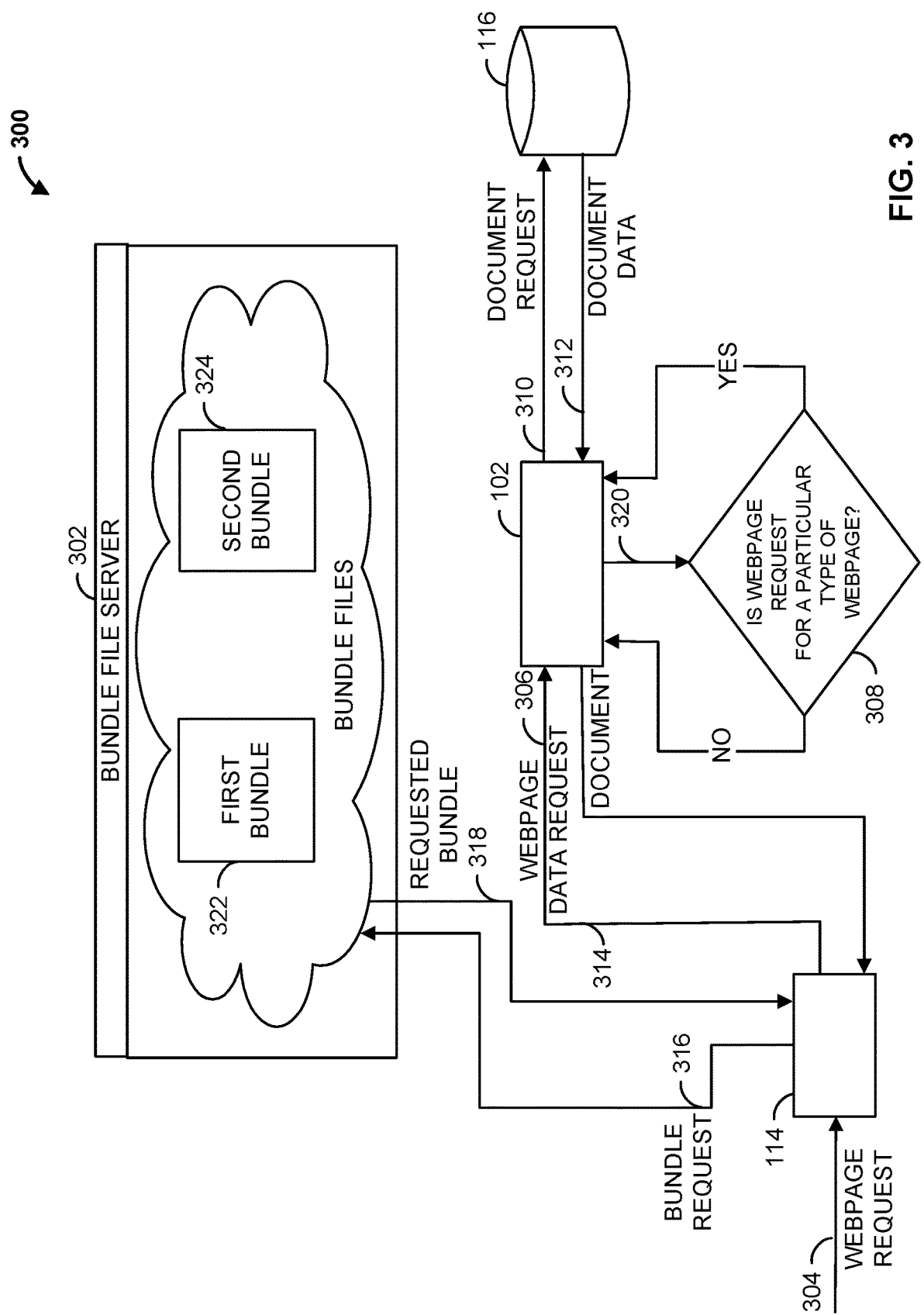
FIG. 3 is another block diagram of a webpage serving system, in accordance with some embodiments.

FIG. 3 illustrates a block diagram of a web serving system 300 that includes server 102, database 116, customer computing device 114, and a bundle file server 302. Bundle file server 302 may be any suitable server, such as a web server, a cloud-based server, or any other suitable storage device. Customer computing device 114 may receive a webpage request 304 to access a webpage, such as one hosted by server 102. For example, customer computing device 114 may execute a web browser. A user of customer computing device 114 may enter a web address of the webpage into an address bar of the web browser, and engage (e.g., click a search icon of) the web browser so that the web browser attempts to load the webpage. Upon receiving webpage request 304, customer computing device 114 transmits a webpage data request 306 requesting data, such as an HTML document, for the requested webpage.

The webpage data request 306 is received by server 102, which hosts the webpage. Server 102, in response to receiving webpage data request 306, determines whether the requested webpage is of a particular type. In this example, webpage type request 320 is provided to webpage type determination logic 308 of server 102 to determine whether the requested webpage is of the particular type. One particular type of webpage may include a webpage that allows a customer to add multiple items to an online shopping cart at one time. Another particular type of webpage may include a webpage that identifies multiple items for sale.

Webpage type determination logic 308 may receive webpage type request 320 identifying the requested webpage and obtain the type of webpage for the requested webpage from database 116. For example, database 116 may store data indicating the type of webpage for each webpage hosted by server 102. The data may be predefined and stored in database 116, for example. Webpage type determination logic 308 may determine whether the requested webpage is of a particular type by comparing the type of the requested webpage to the particular type. The particular type of webpage may be predefined, for example.

In some examples, webpage type request 320 includes data identifying the particular type of webpage that the type of the requested webpage is to be checked against. Based on the type of webpage obtained from database 116 for the requested webpage, webpage type determination logic 308 may determine whether the requested webpage is of the particular type identified by webpage type request 320. For example, webpage type determination logic 308 may compare the type of webpage obtained from database 116 for the requested webpage to the particular type of webpage identified by webpage type request 320. In response, webpage type determination logic 308 provides an indication (e.g., yes or no) of whether the requested webpage is of the particular type.

Based on the webpage type determination, server 102 may provide a document, such as an HTML document, to customer computing device 114. For example, server 102 may transmit a document data request 310 to database 116 requesting document data identifying a document for the requested webpage based on the requested webpage's type as determined by webpage type determination logic 308. If webpage type determination logic 308 determines that the requested webpage is not of the particular type, server 102 may obtain document data from database 116 for one type of webpage (e.g., a default, or regular, webpage). Otherwise, if webpage type determination logic 308 determines that the requested webpage is of the particular type, server 102 may obtain document data from database 116 for that particular type of webpage. In other words, based on the type of requested webpage, server 102 obtains a corresponding document, such as an HTML document, for the requested webpage, where each type of webpage may have a corresponding document. Server 102 provides the document 314 to customer computing device 114.

Each document may include instructions to download a bundle, such as a bundle that includes JavaScript® files, from bundle file server 302. For example, each document may include instructions to download either first bundle 322, or second bundle 324. First bundle 322 may be a "base" bundle that may be used with "regular" webpages. Second bundle 324 may be a "special" bundle that may be used with particular types of webpages. For example, second bundle 324 may be used with webpages that allow a customer to add multiple items to an online shopping cart at one time. As another example, second bundle 324 may be used with webpages that identify multiple items for sale. Second bundle 324 may include more data for download that first bundle 322, for example. As a result, for webpages that do not include, or do not need, functionality provided by one bundle (e.g., second bundle 324), unused or unnecessary data is not downloaded. Instead, a different bundle (e.g., first bundle 322) is downloaded that includes only the data needed by those webpages.

In some examples, server 102 edits a document identified by the obtained document data with instructions to download a corresponding bundle. For example, server 102 may edit a document based on the type of webpage determined for the requested webpage. If webpage type determination logic 308 determines that the requested webpage is not of the particular type, server 102 may edit the document with instructions to download a first bundle (e.g., a default bundle, a "base bundle" for regular webpages). Otherwise, if webpage type determination logic 308 determines that the requested webpage is of the particular type, server 102 may edit the document with instructions to download a second bundle that corresponds to the particular type of webpage (e.g., a "special" bundle, such as one that corresponds to a website that allows a customer to add multiple items to an online shopping cart at one time).

Based on document 314, customer computing device 114 requests from bundle file server 302 a corresponding bundle for document 314. For example, customer computing device 114 may, via a browser, interpret (e.g., read) instructions provided by document 314 to download a bundle. The instructions may indicate that a bundle, such as first bundle 322 or second bundle 324, is to be downloaded from a server, such as bundle file server 302. For example, the instructions may indicate a web address of the server from which to download the bundle, and an identification of the bundle, such as a file name. Upon execution of the instructions, customer computing device 114 provides a bundle request 316 to bundle file server 302 identifying the bundle to download. In response, bundle file server 302 provides the requested bundle 318 to customer computing device 114. Customer computing device 114 may then display the webpage, such as by displaying the webpage on a web browser.

Figure 4A:
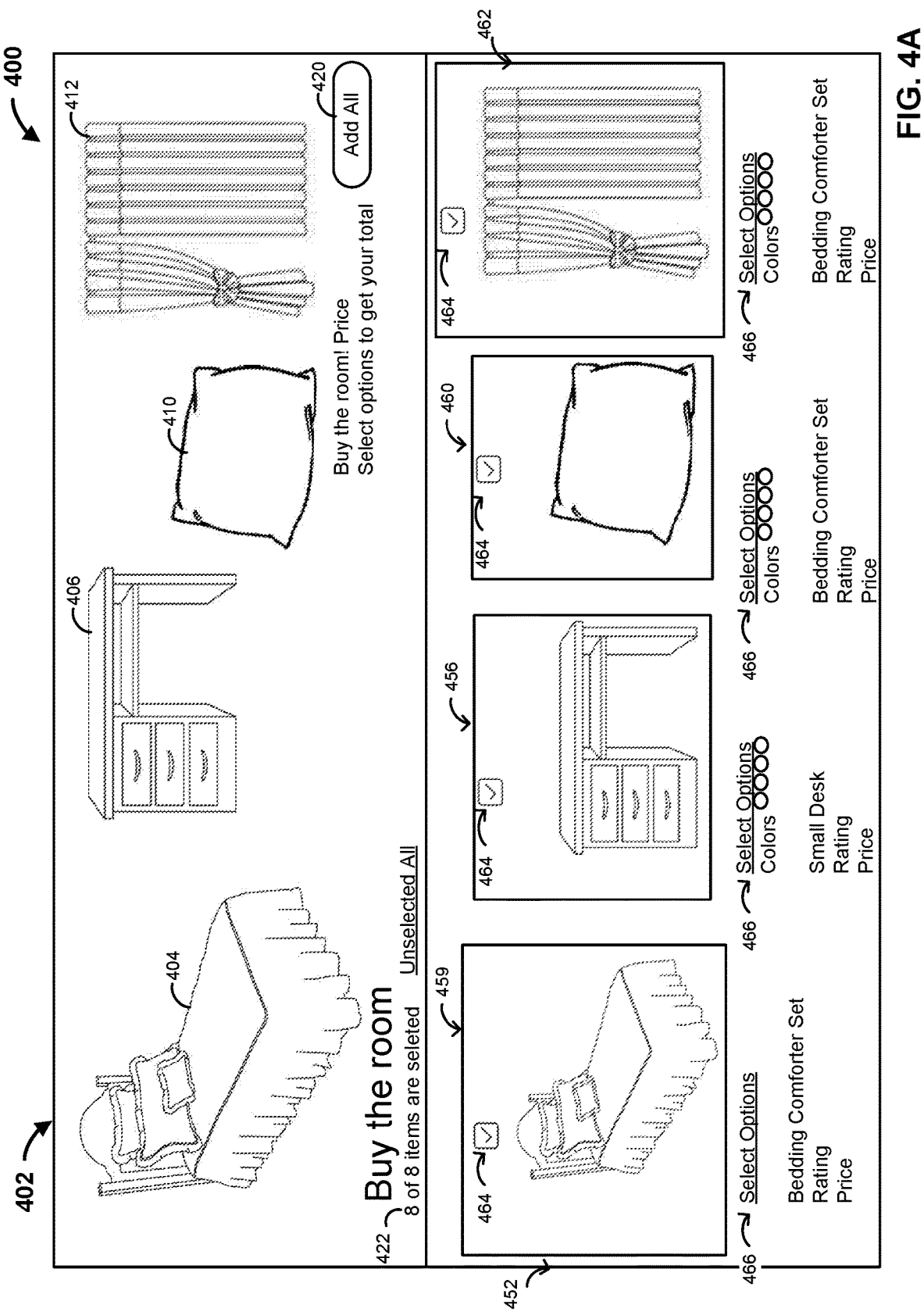

FIG. 4A illustrates an example webpage 400 that may be provided by, for example, server 102 of FIG. 1. Webpage 400 includes a first display portion 402 that includes a display of a plurality of items together for sale, such as a display of a room that includes multiple items for sale (e.g., a "Buy the Room (BTR)" webpage). In this example, the plurality of items displayed in first display portion 402 include, among other items, a bed 404, a desk 406, a bean bag 410, and a curtain 412. The plurality of items may be preselected by the retailer (e.g., a designer) to assure they coordinate well together. For example, the retailer may select items that go well together in a bedroom or in a dorm room, for example.

Webpage 400 also includes a second display portion 452 that displays individually the plurality of items for sale. In this example, the second display portion 452 includes bed display 454, desk display 456, bean bag display 460, and curtain display 462. In some examples, webpage 400 allows a user to scroll down second display portion 452 to display additional items that are for sale, such as additional items that appear in first display portion 402.

Webpage 400 may also allow a user to select one or more of the plurality of items for purchase. Selection boxes 464 in second display portion 452 allow for the selection, or deselection, of a corresponding item. For example, if a selection box 464 is currently selected (e.g., indicated by a checkmark), and a customer selects the selection box 464 (e.g., such as by using an I/O device 203), the selection box 464 becomes unselected (e.g., no checkmark). If, however, the selection box 464 is unchecked, a customer may select the corresponding item by selecting the corresponding selection box for that item. In some examples, webpage 400 defaults to selecting all items available for purchase on webpage 400 (e.g., all selection boxes 464 are checked).

Second display portion 452 may also include an icon for each of the plurality of items that, when engaged by the customer, allows the customer to view additional details of the item and/or selection options for the item. For example, "Select Options" icon 466 allows a customer to select additional options for a corresponding item. FIG. 4B shows an example of an item options window 470 that may be displayed when a customer engages a "Select Options" icon 466 to allow the customer to select options for bed 404.

Item options window 470 may be displayed as an overlay over a portion of first display portion 402 and/or a portion of second display portion 452, and may include various options 472 that a customer may select for the corresponding item. Items options window 470 may also include ratings 474 for the corresponding item, additional information 476 for the item, and a details icon 478 (e.g., "See More Details") that allows a customer to view additional details of the corresponding item. For example, server 102 may display a new window when a customer engages details icon 478 to display further details of the corresponding item. In some examples, the further details are displayed in item options window 470. Item options window 470 also includes "Save Selection" icon 480 that saves the selected options for the corresponding item when engaged by the customer. In some examples, after engaging "Save Selection" icon 480, item options window 470 closes.

Referring back to FIG. 4A, first display portion 402 may also include "Add All" icon 420 that allows all selected items to be added to an online shopping cart in one transaction (e.g., at one time). For example, assuming that the selection boxes 464 for bed display 454, desk display 456, bean bag display 460, and curtain display 462 are selected, "Add All" icon 420 adds all the corresponding items to the customer's online shopping cart in one transaction. In this example, bed 404, desk 406, bean bag 410, and curtain 412 are all added to the customer's online shopping cart upon the customer engaging the "Add All" icon 420.

Figure 4C:
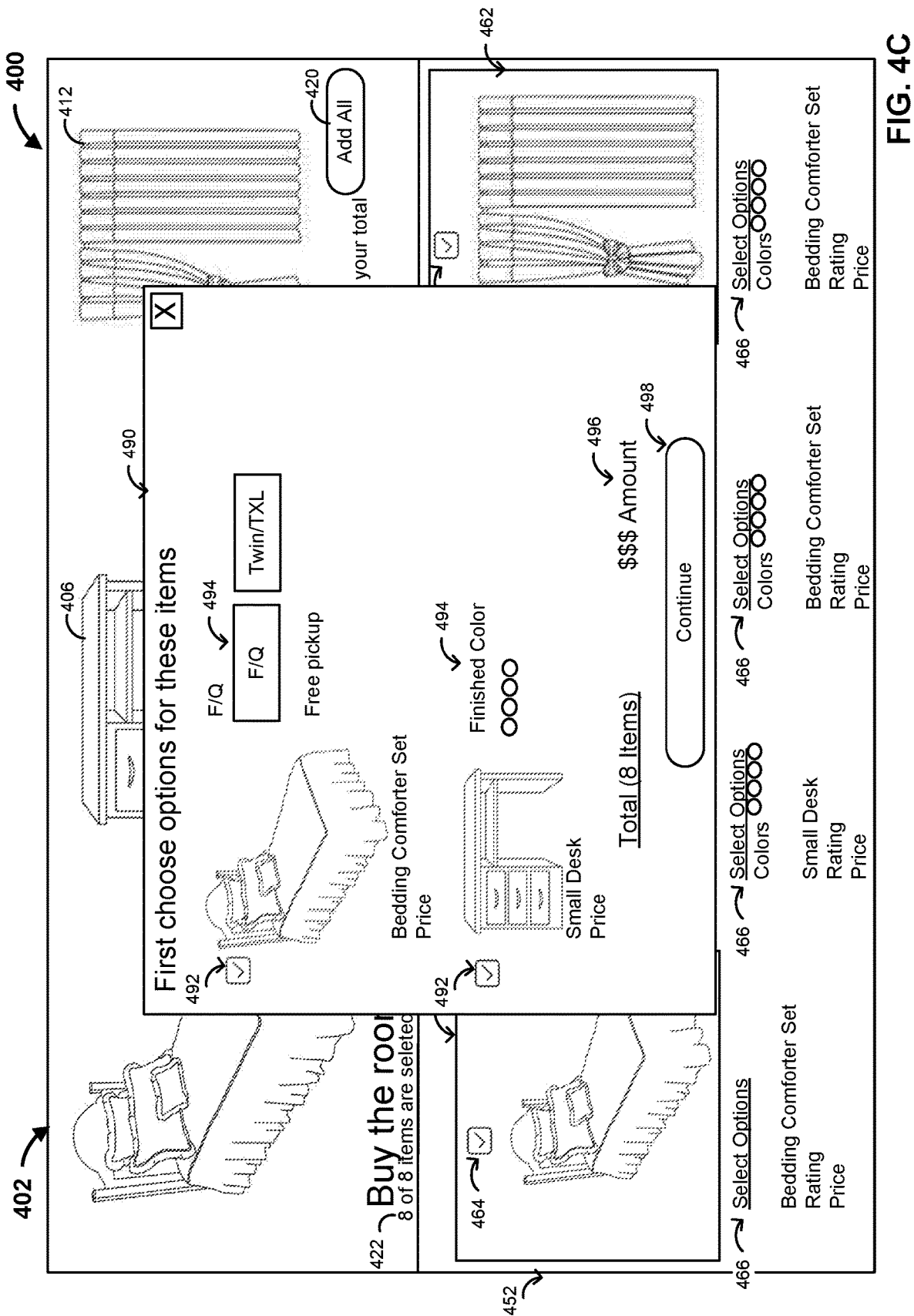

In some examples, upon engaging the "Add All" icon 420, an options modal window 490 is displayed. For example, as illustrated in FIG. 4C, options modal window 490 may be displayed as an overlay over a portion of first display portion 402 and/or a portion of second display portion 452. Options modal window 490 allows a customer to select options for the items selected, and to unselect, or reselect, items for purchase. For example, options modal window 490 may include selection boxes 492 that default to being selected. A customer may deselect an item by engaging the item's corresponding selection box 492. Options modal window 490 may also include options 494 that a customer may select for one or more of the corresponding items. Options modal window 490 may further display a total price 496, which is the total price of the selected items, including any price differences based on the selected options. Options modal window 490 updates the total price 496 in real-time, e.g., as the customer selects or deselects items or item options.

In some examples, options modal window 490 defaults the options for each item to any options the customer selected for that item in a corresponding item options window 470. In some examples, options modal window 490 displays only items for which the customer did not select options in a corresponding item options window 470 for that item. In these examples, total price 496 would also reflect the price of any items for which options have already been selected. In some examples, options modal window 490 deselects and disables the corresponding selection box 492 for any item that is out of stock.

Options modal window 490 may also include a "Continue" icon 498. "Continue" icon 498 adds all of the selected items to an online shopping cart in one transaction (e.g., at one time). Upon a user engaging "Continue" icon 498, webpage 400 may display a summary message of the items added to the online shopping cart, and may further display one or more icons that a user may engage to either continue shopping (e.g., "Continue Shopping" icon), or to proceed to the online shopping cart for checkout and purchase (e.g., "View Cart" or "Checkout" icon). In some examples, if a user selects the "Continue" icon 498 but all options for all items have not been selected, the user is provided with a verification request that the user would like to proceed with default options for those unselected options.

Figure 5:
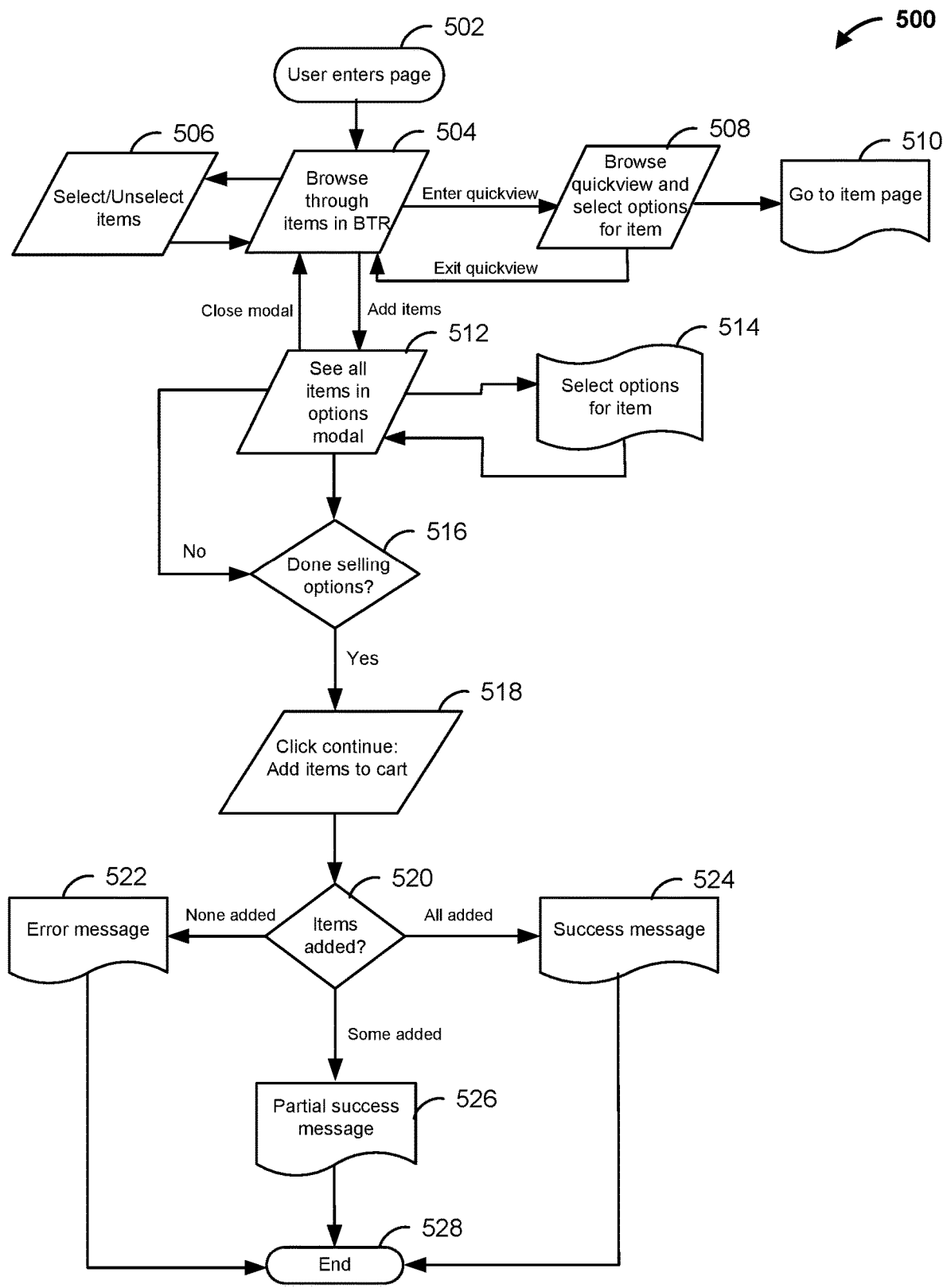
FIG. 5 is a flowchart of an example method that can be carried out by the webpage serving system of FIG. 1, in accordance with some embodiments.

FIG. 5 illustrates an example method 500 that can be carried out by, for example, the webpage serving system 100 of FIG. 1. Beginning at step 502, a user (e.g., customer) enters a webpage that may be hosted by server 102. Server 102 may receive a webpage data request 306 for webpage 400 of FIG. 4A which may be a "Buy the Room" webpage, for example. Proceeding to step 504, the user browses through items on the webpage. The user may select an item and enter a quick-view window at step 508 that allows the user to select options for the item. For example, the user may have selected "Select Options" icon 466 for an item, and in response an item options window 470 may be displayed as discussed above with respect to FIG. 4B. From the quick-view window, the user may also proceed to the item's individual page at step 510 by, for example, engaging a details icon 478. Back at step 508, the user may exit the quick-view window and continue browsing items at step 504.

From step 504, a user may select or unselect items at step 506. For example, the user may select an item by clicking on a corresponding selection box 464 for the item. To proceed with purchasing the selected items, the user may engage an icon such as an "Add Items" icon, which may present the user with another window (e.g., a floating window) at step 512 showing all items selected. The window may be an options modal window 490 that allows the user to make option selections for the selected items. At step 514, the user may make option selections for an item. In some examples, the window presented at step 512 only displays items for which no options were previously selected, such as any previously selected options at step 508.

From step 512, the method proceeds to step 516 to determine if all options have been selected for all selected items. If all options have been selected, the method proceeds to step 518. At step 518, the user engages an icon allowing the user to add all selected items to an online shopping cart in one transaction (e.g., at the same time). The icon may be a "Continue" icon 498, for example.

Figure 6:
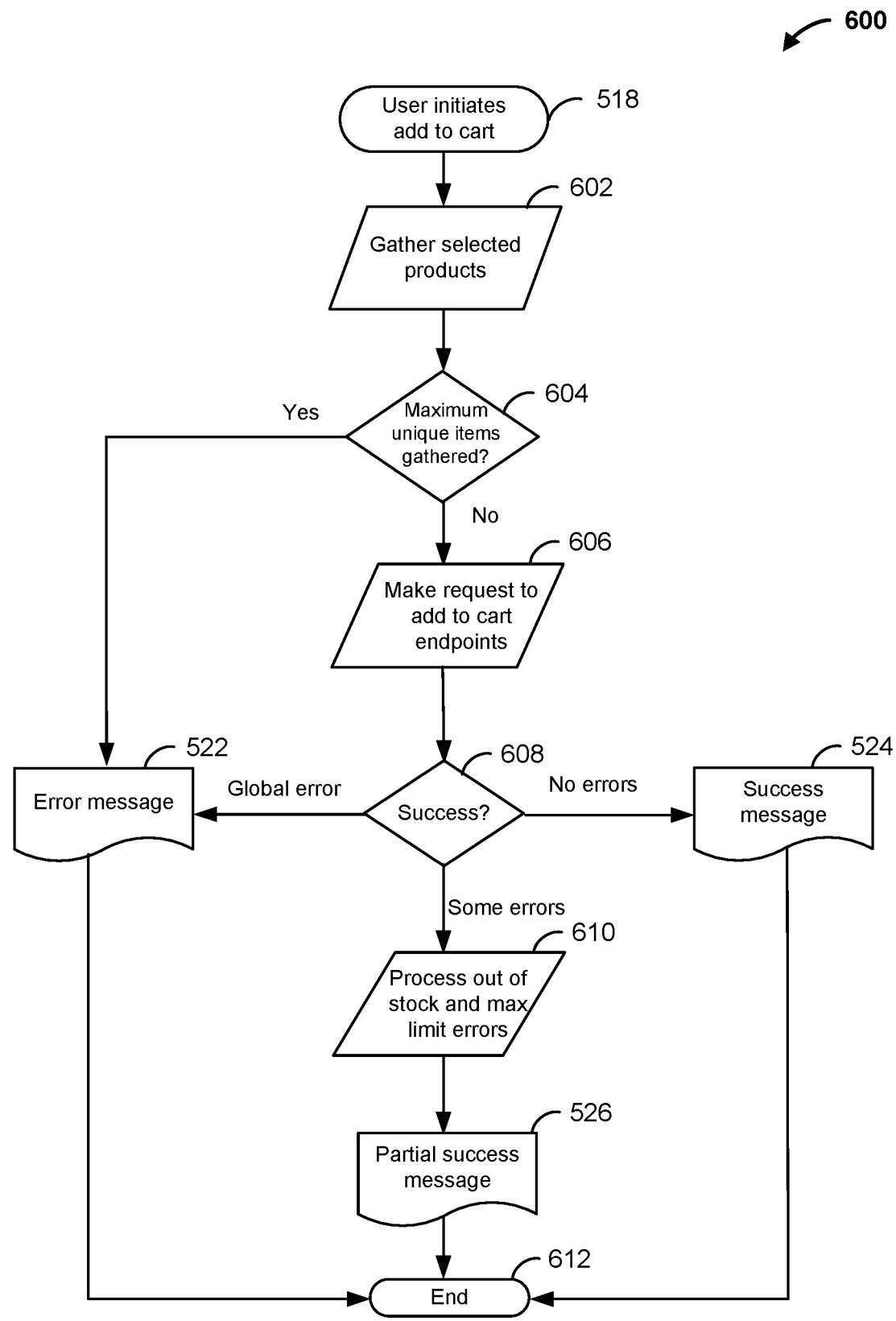
FIG. 6 is a flowchart of another example method that can be carried out by the webpage serving system of FIG. 1, in accordance with some embodiments.

The method proceeds from step 518 to step 520, where a determination is made as to whether all selected items were successfully added to the online shopping cart. For example, server 102 may determine whether all items with the selected options are available (e.g., in stock). FIG. 6 and its corresponding description provide additional details with regards to step 520. If none of the selected items are available, the method proceeds to step 522 where an error message is displayed. For example, the webpage may display an indication that none of the items are currently available. The method then ends at step 528.

Otherwise, if all items were successfully added to the online shopping cart, the method proceeds to step 524 where a success message is displayed on the webpage. For example, the webpage may display an indication that all items have been successfully added to the online shopping cart. The method then ends at step 528. If at least one, but not all, items were successfully added, the method proceeds to step 526, where a partial success message is displayed. For example, the partial success message may identify the items that were added to the online cart, and the items that were not added to the online shopping cart. In some examples, the user is provided with an option to remove the items from the shopping cart. For example, the webpage may provide a "Remove Added Items" icon that, if engaged, will remove the added items from the online shopping cart at the same time. The method then ends at step 528.

FIG. 6 illustrates an example method 600 that may be carried out by, for example, the webpage serving system 100 of FIG. 1. In some examples, step 520 of FIG. 5, where a determination is made as to whether items were added to an online shopping cart, may include method 600. Beginning at step 518, a user engages an icon that allows the user to add all selected items to an online shopping cart in one transaction (e.g., at the same time). At step 602, all selected products are gathered. For example, products may be gathered by compiling product identifiers for the products into a list and, for example, storing the list to database 116. The product identifiers and/or identification of the list may then be added to an "add-to-online-shopping-cart" request that may be transmitted to a back-end server that processes the request (e.g., adds the products to a customer's online shopping cart).

The method proceeds to step 604, where a determination is made as to whether the maximum number of unique items are gathered. If at least the maximum number of unique items have been gathered, the method proceeds to step 522, where an error message is displayed to the user. The method then ends.

Otherwise, the method proceeds to step 606 where a request is made to add the items to the online shopping cart. For example, the request may be made to a back-end server that handles online purchases. The request may contain, for example, the list of product identifiers gathered in step 602, as well as user identifiable information (e.g., user ID, or an anonymous ID) that can be used to match the online shopping cart to a user (e.g., customer).

From step 606, the method proceeds to step 608 where a determination is made as to whether the request to add the items to the online shopping cart was successful. If all items were added to the online shopping cart successfully, the request was successful and the method proceeds to step 524, where a success message is displayed. The method then ends.

Otherwise, if not all items were successfully added to the online shopping cart, the method proceeds to step 610 where errors for items that were not successfully added to the online shopping cart are analyzed. For example, at step 610, errors related to out of stock items are processed. As another example, errors related to attempting to order more than a maximum number of a particular item (e.g., maximum limit errors) are also processed. Processing the errors may include, for example, generating data identifying and characterizing readable text that may be provided as a partial success message. The method proceeds to step 526, where the partial success message is displayed to the user. The method then ends at step 612.

Figure 7:
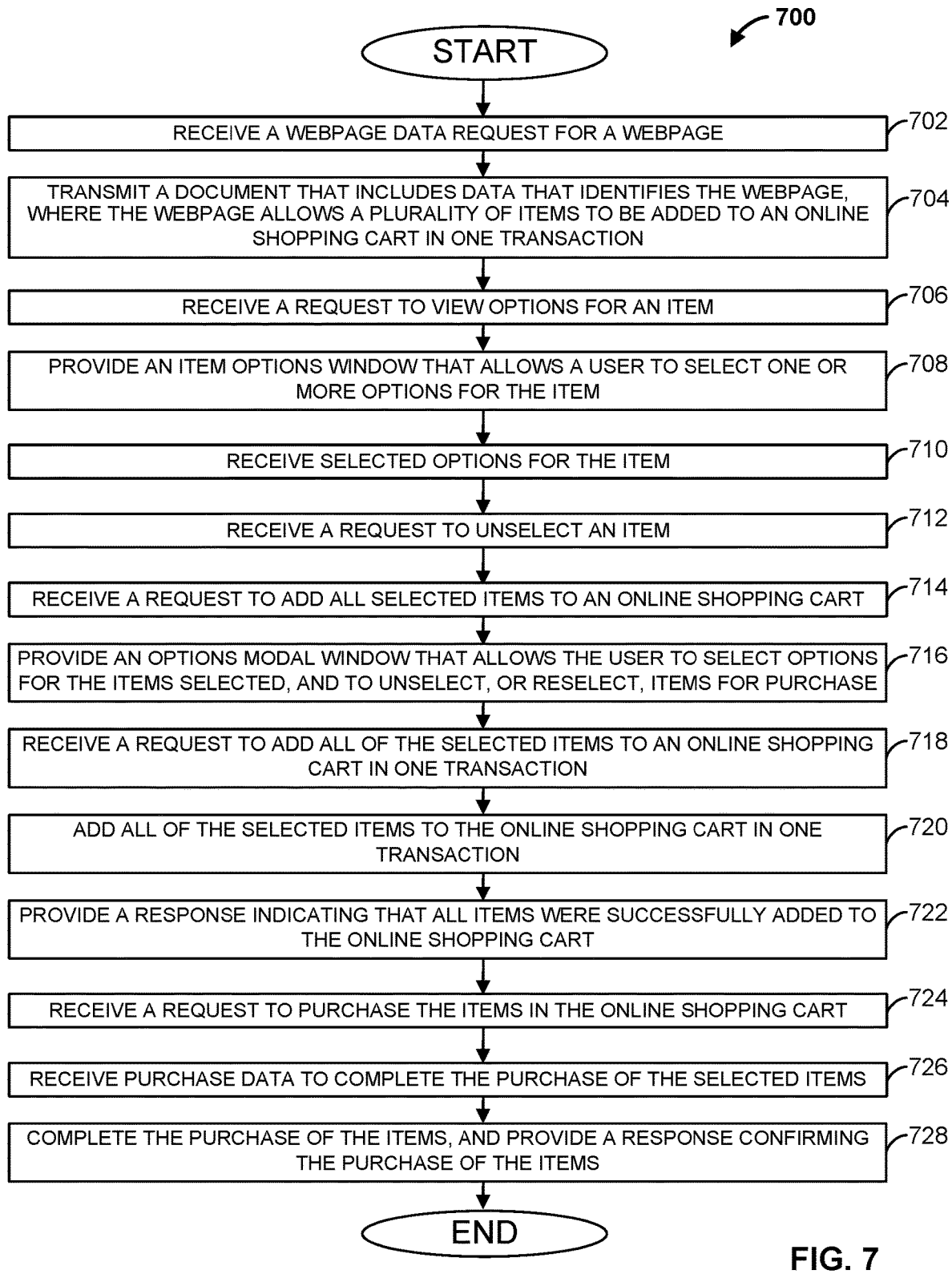
FIG. 7 is a flowchart of an example method that can be carried out by the server 102 of FIG. 1, in accordance with some embodiments.

FIG. 7 illustrates an example method 700 that may be carried out by, for example, server 102 of FIG. 1. At step 702, server 102 receives a webpage data request, such as webpage data request 306, for a webpage hosted by server 102, which may be a "Buy the Room" webpage, for example. The webpage may be webpage 400, for example. At step 704, server 102 provides a document in response to the webpage data request. The document includes data identifying a webpage that allows a customer to add a plurality of items to an online shopping cart in one transaction (e.g., at the same time). For example, the document may identify a bundle, such as one hosted by bundle file server 302, that includes one or more files that allow the webpage to provide the functionality allowing the customer to add more than one item to the online shopping cart in one transaction (e.g., at one time).

At step 706, server 102 receives a request to view options for an item. For example, a user may have selected a "Select Options" icon 466 on webpage 400. At step 708, in response to the request to view options for the item, server 102 provides an item options window 470 that allows the user to select one or more options for the item. At step 710, server 102 receives selected options for the item. For example, the user may select a "Save Selection" icon 480 that saves the selected options for the corresponding item when engaged by the user. The method then proceeds to step 712.

At step 712, server 102 receives a request to unselect at least one item of the plurality of items. For example, webpage 400 may default to having all of the plurality of items selected for purchase. The user may not want at least one of the items, so unselects the item on webpage 400. At step 714, server 102 receives a request to add all selected items to an online shopping cart. For example, the user may select an "Add All" icon 420 that allows all selected items to be added to an online shopping cart in one transaction. In response, at step 716, an options modal window 90 is provided for display to the user. Options modal window 490 allows the user to select options for the items selected, and to unselect, or reselect, items for purchase. The options modal window 490 may, in some examples, display only items for which options have not yet been selected.

Proceeding to step 718, server 102 receives a request to add all of the selected items to an online shopping cart in one transaction. For example, the user may engage a "Continue" icon 498 on the options modal window 490 that, when engaged, provides the request to add all of the selected items to the online shopping cart in one transaction. At step 720, in response to the request, server 102 adds all of the selected items to the online shopping cart in one transaction (e.g., at the same time).

At step 722, the server provides a response indicating that all items were successfully added to the online shopping cart. At step 724, the server receives a request to purchase the items in the online shopping cart. For example, webpage 400 may display a "Checkout" icon that allows the user to purchase the items. In response, server 102 provides for display a purchase window allowing the customer to enter in purchase related data. Purchase data may include, for example, name, address, and payment (e.g., credit card or bank information) data. At step 726, server 102 receives the purchase data entered into the webpage 400 by the user. At step 728, server 102 completes the purchase of the items, and provides a response confirming the purchase of the items.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a non-transitory computer-readable medium; and
a processor configured to:
 receive a webpage data request for a webpage;
 obtain, based on the webpage data request, a document associated with a plurality of webpage types for the webpage;
 determine, based on the webpage data request, a webpage type;
 in response to determining the webpage type is not a first webpage type, modify the document to identify a first functionality bundle including webpage functionality data characterizing a first set of webpage functionalities;
 in response to determining the webpage type is the first webpage type, modify the document to identify a second functionality bundle, wherein the second functionality bundle includes webpage functionality data characterizing one or more webpage functionalities not included in the first functionality bundle including enabling a customer to add a plurality of items to a purchase icon at one time;
 transmit, in response to the webpage data request and to a computing device, a dataset that when executed by the computing device causes the computing device to obtain a selected one of the first functionality bundle or the second functionality bundle and generate the webpage based on the document and the selected one of the first functionality bundle or the second functionality bundle, wherein the webpage includes the one or more webpage functionalities as characterized by the selected one of the first functionality bundle or the second functionality bundle;
 based at least in part on the generating of the webpage with the one or more webpage functionalities, receive a request to add the plurality of items to the purchase icon, wherein the request to add the plurality of items to the purchase icon comprises a plurality of selected items;
 in response to the request to add the plurality of items to the purchase icon, transmit data identifying an options modal window that allows for a selection of options for at least one item of the plurality of items;
add the plurality of items to the purchase icon;
determine, based on adding the plurality of items to the purchase icon, a message to be transmitted, wherein the computing device is further configured to transmit one of a success message, a partial success message, or an error message based on the determination; and
transmit the message based on the determination in response to adding the plurality of items to the purchase icon.

2. The system of claim 1, wherein the computing device is configured to:
receive a request to view options of an item of the plurality of items; and
in response to the request to view the options of the item, transmit data identifying a window that displays at least one option for the item.

3. The system of claim 1, wherein the options modal window allows for the selection of options only for any item of the plurality of items for which the options have not yet been selected.

4. The system of claim 1, wherein the data identifying the webpage comprises an indication that the plurality of items are selected.

5. The system of claim 1, wherein the webpage includes a first display portion that comprises a display of the plurality of items together, and a second display portion that displays the plurality of items individually.

6. The system of claim 1, wherein the processor is configured to select a set of items for inclusion in the webpage, wherein the set of items is selected based at least in part on the one or more webpage functionalities characterized by the webpage functionality data, and wherein the webpage includes the set of items.

7. The system of claim 1, wherein the processor is configured to determine, based on adding the plurality of items to the purchase icon, the message to be transmitted includes the partial success message, and wherein the partial success message enables a user to remove the plurality of items from the purchase icon, and wherein a webpage functionality for removing the plurality of items is defined in the second bundle.

8. A method by a computing device comprising:
receiving a webpage data request for a webpage;
transmitting, in response to the webpage data request, data identifying the webpage;
obtaining, based on the webpage data request, a document associated with a plurality of webpage types for the webpage;
determining, based on the webpage data request, a webpage type;
in response to determining the webpage type is not a first webpage type, modifying the document to identify a first functionality bundle including webpage functionality data characterizing a first set of webpage functionalities;
in response to determining the webpage type is the first webpage type, modifying the document to identify a second functionality bundle, wherein the second functionality bundle includes webpage functionality data characterizing one or more webpage functionalities not included in the first functionality bundle including enabling a customer to add a plurality of items to a purchase icon at one time;
transmitting, in response to the webpage data request and to a computing device, a dataset that when executed by the computing device causes the computing device to obtain a selected one of the first functionality bundle or the second functionality bundle and generate the webpage based on the document and the selected one of the first functionality bundle or the second functionality bundle, wherein the webpage includes the one or more webpage functionalities as characterized by the selected one of the first functionality bundle or the second functionality bundle;
based at least in part on the generating of the webpage with the one or more webpage functionalities, receiving a request to add the plurality of items to the purchase icon, wherein the request to add the plurality of items to the purchase icon comprises a plurality of selected items;
in response to the request to add the plurality of items to the purchase icon, transmitting data identifying an options modal window that allows for a selection of options for at least one item of the plurality of items;
adding the plurality of items to the purchase icon;
determining, based on adding the plurality of items to the purchase icon, a message to be transmitted, wherein the computing device is further configured to transmit one of a success message, a partial success message, or an error message based on the determination; and
transmitting the message based on the determination in response to adding the plurality of items to the purchase icon.

9. The method of claim 8 comprising:
receiving a request to view options of an item of the plurality of items; and
in response to the request to view the options of the item, transmitting data identifying a window that displays at least one option for the item.

10. The method of claim 8 wherein the options modal window allows for the selection of options only for any item of the plurality of items for which the options have not yet been selected.

11. The method of claim 8 wherein the data identifying the webpage comprises an indication that the plurality of items are selected.

12. The method of claim 8 wherein the webpage includes a first display portion that comprises a display of the plurality of items together, and a second display portion that displays the plurality of items individually.

13. The method of claim 8, wherein the plurality of webpage types comprise a first webpage type and a second webpage type, and wherein the first webpage type is associated with the bundle and the second webpage type is associated with a second bundle, the second bundle including instructions that enables the webpage to provide one or more functions.

14. The method of claim 8, comprising selecting a set of items for inclusion in the webpage, wherein the set of items is selected based at least in part on the one or more webpage functionalities characterized by the webpage functionality data, and wherein the webpage includes the set of items.

15. The method of claim 8, comprising determining, based on adding the plurality of items to the purchase icon, the message to be transmitted includes the partial success message, and wherein the partial success message enables a user to remove the plurality of items from the purchase icon, and wherein a webpage functionality for removing the plurality of items is defined in the second bundle.

16. A non-transitory, computer-readable storage medium comprising executable instructions that, when executed by one or more processors, cause the one or more processors to:
receive a webpage data request for a webpage;
transmit, in response to the webpage data request, data identifying the webpage;
obtain, based on the webpage data request, a document associated with a plurality of webpage types for the webpage;
determine, based on the webpage data request, a webpage type;
in response to determining the webpage type is not a first webpage type, modify the document to identify a first functionality bundle including webpage functionality data characterizing a first set of webpage functionalities;
in response to determining the webpage type is the first webpage type, modify the document to identify a second functionality bundle, wherein the second functionality bundle includes webpage functionality data characterizing one or more webpage functionalities not included in the first functionality bundle including enabling a customer to add a plurality of items to a purchase icon at one time;
transmit, in response to the webpage data request and to a computing device, a dataset that when executed by the computing device causes the computing device to obtain a selected one of the first functionality bundle or the second functionality bundle and generate the webpage based on the document and the selected one of the first functionality bundle or the second functionality bundle, wherein the webpage includes the one or more webpage functionalities as characterized by the selected one of the first functionality bundle or the second functionality bundle;
based at least in part on the generating of the webpage with the one or more webpage functionalities, receive a request to add the plurality of items to the purchase icon, wherein the request to add the plurality of items to the purchase icon comprises a plurality of selected items;
in response to the request to add the plurality of items to the purchase icon, transmit data identifying an options modal window that allows for a selection of options for at least one item of the plurality of items;
add the plurality of items to the purchase icon;
determine, based on adding the plurality of items to the purchase icon, a message to be transmitted, wherein the computing device is further configured to transmit one of a success message, a partial success message, or an error message based on the determination; and
transmit the message based on the determination in response to adding the plurality of items to the purchase icon.

17. The computer-readable storage medium of claim 16, wherein the executable instructions, when executed by the one or more processors, cause the one or more processors to:
receive a request to view options of an item of the plurality of items; and
in response to the request to view the options of the item, transmit data identifying a window that displays at least one option for the item.

18. The computer-readable storage medium of claim 16, wherein the plurality of webpage types comprise a first webpage type and a second webpage type, and wherein the first webpage type is associated with the bundle and the second webpage type is associated with a second bundle, the second bundle including instructions that enables the webpage to provide one or more functions.

19. The computer-readable storage medium of claim 16, wherein the executable instructions, when executed by the one or more processors, cause the one or more processors to select a set of items for inclusion in the webpage, wherein the set of items is selected based at least in part on the one or more webpage functionalities characterized by the webpage functionality data, and wherein the webpage includes the set of items.

* * * * *